D. MILLER.
SPEED INDICATOR.
APPLICATION FILED JUNE 29, 1907.
910,404.
Patented Jan. 19, 1909.
2 SHEETS—SHEET 1.
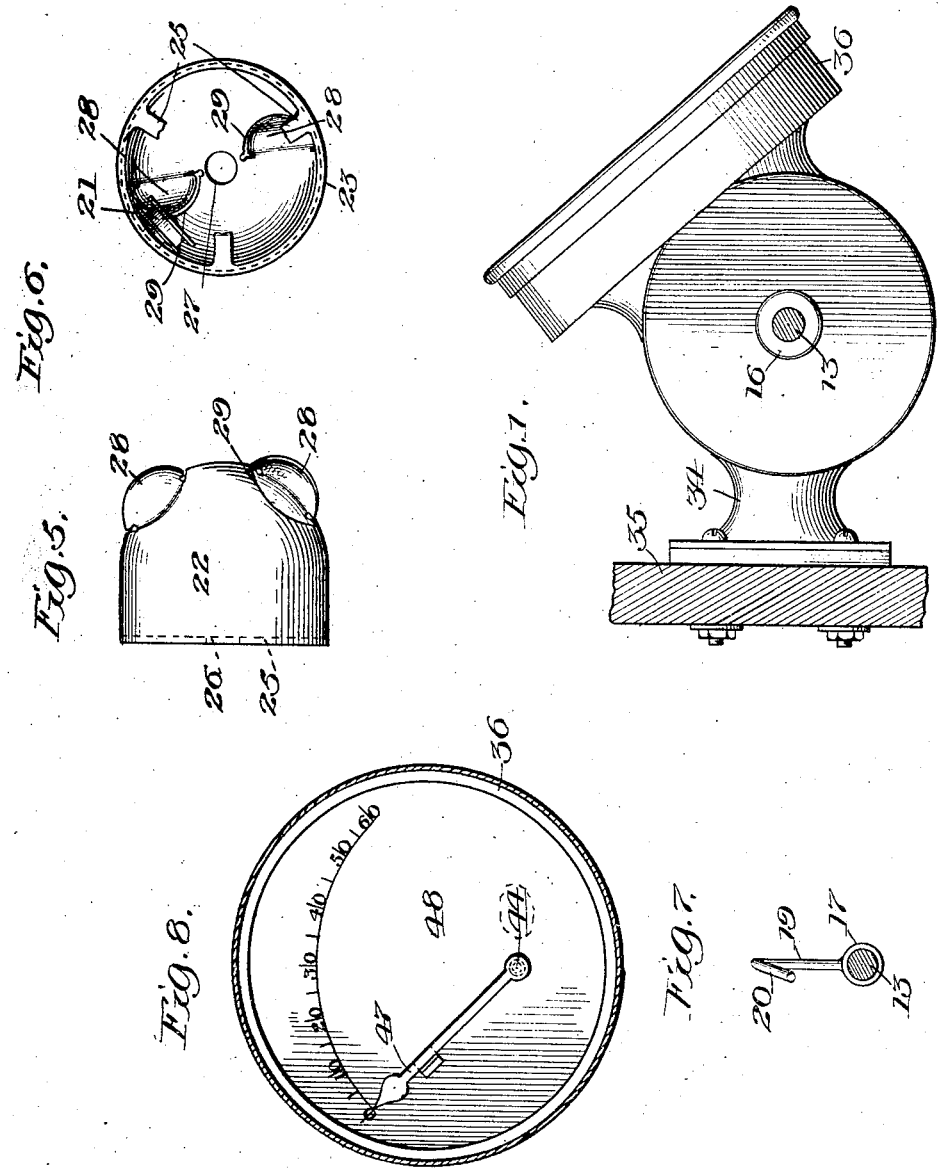

D. MILLER.
SPEED INDICATOR.
APPLICATION FILED JUNE 29, 1907.
910,404.
Patented Jan. 19, 1909.
2 SHEETS—SHEET 2.
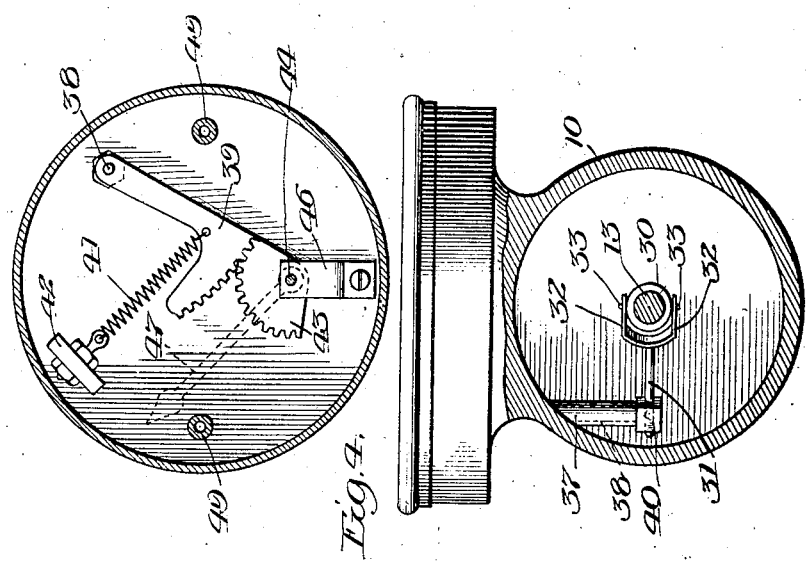
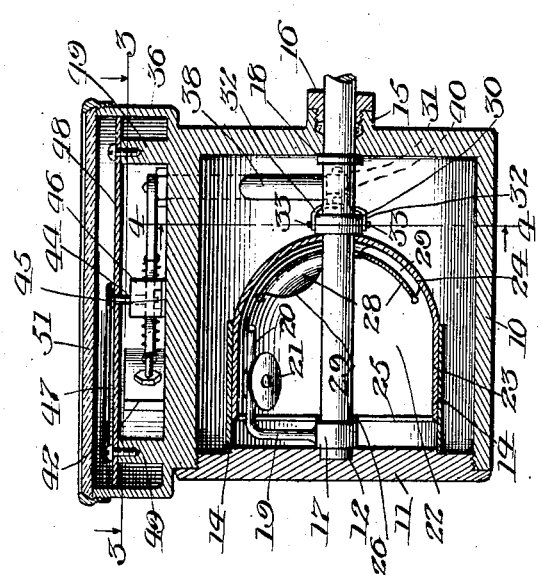

UNITED STATES PATENT OFFICE.

DORR MILLER, OF CHICAGO, ILLINOIS, ASSIGNOR TO McCORD & COMPANY, OF CHICAGO ILLINOIS, A CORPORATION OF NEW JERSEY.

SPEED-INDICATOR.

No. 910,404.　　　　Specification of Letters Patent.　　　　Patented Jan. 19, 1909.

Application filed June 29, 1907. Serial No. 381,444.

*To all whom it may concern:*

Be it known that I, DORR MILLER, a citizen of the United States, residing at Chicago, in the county of Cook and State of Illinois, have invented certain new and useful Improvements in Speed-Indicators, of which the following is a specification, reference being had therein to the accompanying drawing.

My invention relates to speed indicators, and especially to a new and improved form employing a liquid in a closed chamber and subjected to pressure by mechanism in the chamber, by means of which the speed of rotation, as of an axle or shaft, is measured and indicated on a dial, and has reference particularly to such devices for determining the rate of travel of automobiles.

The invention consists in the constructions and arrangements of the parts hereinafter described and then set out in the appended claims.

In the accompanying drawings in which the same reference numerals refer to like parts—Figure 1 is a side view of a device embodying my invention; Fig. 2 is a central longitudinal sectional view; Fig. 3 is a sectional view on the line 3—3 of Fig. 2; Fig. 4 is a view partly in elevation and partly in cross-section on the line 4—4 of Fig. 2; Fig. 5 is a view in elevation of the cup; Fig. 6 is an end view looking into the cup, parts being broken away; Fig. 7 is a detail view of the shaft and arm, and Fig. 8 is a front view of the dial and pointer.

A cylindrical metal casing 10 providing a chamber is internally threaded at its open end to receive the threads on the head 11 which when screwed in the casing completely closes the same and prevents the escape of the oil or other suitable liquid with which it is filled. The head is recessed at 12 to provide a bearing for one end of the driving shaft 13, and carries an annulus 14 secured to the inner face thereof. The other end of the shaft passes through the closed end of the casing and a sleeve 15 which is integral therewith and internally threaded to receive a screw plug 16, forming a stuffing box. The plug is reamed out to provide a bearing for the shaft which passes therethrough and may be connected in any suitable manner with the axle of an automobile or other vehicle whose speed it may be desired to indicate. The sleeve is of greater diameter than the shaft and is filled with suitable packing which surrounds the shaft and when the plug is screwed in prevents the escape of the oil from the cylinder.

The shaft carries collars 17 and 18 secured thereto, the latter bearing against the inner face of the end of the chamber to prevent the shaft from being drawn therethrough and serves also to hold it seated in the recess 12. An arm 19 secured to the collar 17 projects at a right angle to the shaft and has a finger 20 which lies in a plane parallel with the shaft but is angularly or obliquely disposed to said shaft, as shown in Fig. 7. The finger is adapted to engage a roller 21 pivoted to the inner surface of a cup 22, of less diameter than the annulus, and comprising a cylindrical portion 23 and a dome or hemispherical portion 24. The cup is adapted to telescope with the annulus which with the head acts as a cap and serves to close it. A spider 25 secured to the open end of the cup is centrally reamed out to provide a suitable opening 26 which together with a similar opening 27 in the apex of the dome provide bearings for the cup on the shaft 13 on which the cup is adapted to be revolved and moved therealong in a manner to be hereinafter described.

The dome is provided externally with oppositely disposed wings or ears 28, which may be of any suitable shape but in the present instance are substantially semicircular and are formed by outturned portions of the dome. The ears incline or lead in the same direction and provide opening 29 in the dome, and while but two ears are shown it is to be understood that a greater number may be employed.

An intermediate collar 30 loosely carried by the shaft bears against the outer surface of the dome and is adapted to be moved along the shaft in one direction by the cup and in turn serves to restore the cup to its normal position in a manner to be described. To the collar 30 is connected a yoke comprising a stem 31 and arms 32 which straddle the shaft and are suitably pivoted to the pins 33 oppositely secured in the collar. It is to be understood that the yoke is disposed laterally to the shaft, as shown in Fig. 4.

The chamber is provided with a bracket 34 by means of which it may be fastened to a support 35, such as the dashboard of a vehicle, and on the side opposite thereto carries an annular casing 36 integral therewith and at an angle to the support.

A fixed sleeve 37 extends through the casing 10 at one side of the shaft 13 and opens into the chamber and into the space provided by the annular casing 36, and a shaft 38 journaled in the sleeve 37 carries at its outer end a rigidly fixed segmental rack-arm 39, and at its inner end a collar 40, also rigidly fixed thereto and into which the stem 31 extends. A contractile spring 41 is secured at one end to the rack arm and at its other end to a bracket 42. The rack arm meshes with a pinion 43 which is secured to a shaft 44, one end of which is suitably journaled in the casing 10 as at 45 and the other reduced end passes through a bracket 46 fixed on the casing 10 and carries a hand or pointer 47 adapted to indicate the speed of the vehicle.

A graduated dial 48 such as shown in Fig. 8 is mounted upon the posts 49 to which it is secured by screws 50 and thus closes the open end of the annular casing, the shaft 44 passing therethrough as shown. A glass front 51 is suitably secured to the annular casing to protect the dial face and the hand.

The operation of my device may be described as follows: The casing 10 is filled with oil or other suitable fluid and the head secured therein. The driving shaft 13 receives its motion from the axle of the vehicle to which the device is attached by any suitable connections, and as the shaft is rotated it is obvious that the finger contacting with the roller also rotates the cup and the oil is forced by the ears into the cup through the openings 29 and compressed within the cup and the headed or closed annulus. By reason of the cup telescoping with the headed annulus the cup is substantially closed thereby and the oil prevented from escaping while being compressed. It is clear that the faster the driving shaft is rotated the greater the compression of the oil. As the oil is compressed it bears against the inner wall of the cup in its effort to escape and forces the cup along the driving shaft in the direction away from the head. The collar 30 which contacts with the dome of the cup and the yoke carried thereon are likewise moved along the driving shaft, the stem of the yoke thus rotating the shaft 38 towards the yoke. As the shaft 38 is thus rotated the rack arm is moved against the action of the spring in the direction of the arrow (Fig. 3), the hand as shown in Figs. 3 and 8 moving from left to right. As the speed rotation of the driving shaft is reduced the spring 41 returns the rack-arm to its normal position, and it is obvious that the shaft 38 and the collar 40 are thus likewise rocked to their normal position to move the collar 30 and cup along the driving shaft to their normal position. It is to be understood that the cup when in its extended position remains within the annulus. The expansive action of the oil compressed between the cup and headed annulus is sufficient to move the cup along the shaft as the parts revolve, and this action is supplemented by the cam action of the oblique finger 20 upon its associated bearing or roller 21, and also by the oblique or propeller like action of the wings against the oil or other fluid in the chamber.

Having described my invention what I claim as new and desire to secure by Letters Patent is—

1. In a device of the class described, a liquid-containing chamber, a shaft therein, a cup mounted on the shaft, a dial, a pointer on the dial, connections between the pointer and cup, and means to cause the cup to move longitudinally on the shaft as the latter revolves.

2. In a device of the class described, a liquid-containing chamber, a driving shaft therein, a cup mounted on the shaft and having openings, wings on the cup at the openings, a dial, a spring-pressed pointer on the dial, a shaft connecting the pointer and the cup, and means to move the cup with the driving shaft as the latter revolves.

3. In a device of the class described, a liquid-containing chamber, a driving shaft therein, a cup having lateral wings providing openings therein mounted on the shaft, an annulus in the chamber, a collar on the shaft adapted to be moved by the cup, a dial, a spring-pressed pointer on the dial, a shaft connecting the pointer and the collar, and means to move the cup with the driving shaft as the latter revolves.

4. In a device of the class described, a liquid-containing chamber, a driving shaft therein, an annulus in the chamber, a cup on the shaft telescoping with the annulus, wings on the cup providing openings therein, means on the shaft to rotate the cup as the shaft is driven, a dial, a spring-pressed pointer on the dial, and connections between the pointer and the cup.

5. In a device of the class described, a liquid-containing chamber, a driving shaft therein, a cup having wings providing openings mounted on the shaft, an annulus in the chamber with which the cup telescopes, a bearing on the cup, an arm on the shaft having an obliquely disposed finger engaging the bearing, a collar on the shaft and adapted to be moved by the cup, a dial, a spring-pressed pointer on the dial, a rock-shaft connected to the pointer, and connections between the rock-shaft and collar.

6. In a device of the class described, a liquid-containing chamber, a driving shaft therein, an annulus in the chamber, a cup mounted on the shaft telescoping with the annulus and having ears providing openings, a roller on the cup, an arm on the shaft having an obliquely disposed finger engaging the roller, a collar on the shaft and adapted to be moved by the cup, a yoke pivoted on the collar, a dial, a pointer on the dial, a rack-arm adapted to move the pointer, a shaft connecting the rack-arm and the yoke, and means to return the parts to their normal position.

7. In a device of the class described, a liquid-containing chamber, a driving shaft therein, a cup on the shaft having ears providing openings and adapted to be rotated by the latter, an annulus in the chamber with which the cup telescopes, a dial, a rack-arm and pinion, a pointer on the pinion, connections between the rack-arm and cup, and a spring connected to the rack-arm against the action of which the rack-arm is moved and which is adapted to return the parts to their normal position.

8. In an indicator, a liquid-containing chamber, a driving shaft therein, a dial, a pointer on the dial, a pair of telescoping elements in the chamber, one of said elements being stationary and the other movable by the shaft to put the liquid under pressure, and connections between the said movable element and said pointer.

9. In an indicator, a liquid-containing chamber, a graduated indicating device, a cup movably mounted in the chamber and having means to force the liquid into the cup to move the same, and connections between the cup and indicating device.

10. In an indicator, a liquid-containing chamber, a graduated indicating device, a pair of telescoping members in the chamber, means to rotate one of the members, said rotating member having means to put the liquid under pressure between the said members, and connections from one of the members to the indicating device.

11. In an indicator, a liquid-containing chamber, a graduated indicating device, a movable cup in the chamber, an annulus in the chamber forming a closure for the cup, said cup having means to compress the liquid therein to move the cup, and connections between the cup and indicating mechanism.

In testimony whereof I affix my signature in presence of two witnesses.

DORR MILLER.

Witnesses:
C. G. McRoberts,
Elizabeth Molitor.